Aug. 23, 1966   R. L. BENTON   3,268,131
MOUNTING DEVICE FOR DOORS OF JEEP-TYPE VEHICLES
Filed May 17, 1965

INVENTOR.
Raymond L. Benton
BY
McGrew & Edwards
*Attorneys*

United States Patent Office 3,268,131
Patented August 23, 1966

3,268,131
MOUNTING DEVICE FOR DOORS OF
JEEP-TYPE VEHICLES
Raymond L. Benton, Denver, Colo., assignor to Kayline Manufacturing, Inc., Denver, Colo., a corporation of Colorado
Filed May 17, 1965, Ser. No. 456,272
11 Claims. (Cl. 224—29)

My invention relates generally to the mounting of detached vehicle doors on a vehicle and more particularly to a novel device for the mounting of detached doors on the hood of a Jeep-type vehicle.

Presently, there are various makes of vehicles having demountable fabric top and door assemblies which are removed during certain periods of usage. A few examples are the Scout, Toyota, Land Cruiser, and the Jeep. The demountable fabric top when detached is easily folded into a relatively compact unit, covered, and stored usually at the rear of the vehicle in such a manner as to result in little space loss with substantially no interference with the seating and carrying capacity of the vehicle.

However, the doors of the vehicle are of a somewhat rigid structure and may not be folded and carried in a manner similar to that of the top. The bulky nature of the doors results in inconvenience and loss of usable space in the vehicle if the doors are placed as for example across the back seat. Heretofore, some mounting devices have been provided at the back of the vehicle but they have not proved entirely satisfactory, particularly due to dust and muddy road conditions. Accordingly, it is an object of my invention to provide a mounting device on the hood of the vehicle for carriage of demountable doors when not in use.

It is another object of my invention to provide a simple, durable, and reliable mounting device for carrying the demounted doors during the normal usage of the vehicle.

It is a further object of my invention to provide a simple, durable, and reliable mounting device for detached doors which may be easily attached to the vehicle, easily operated, and will not interfere with the use of the vehicle when the doors are in their normal position.

Further objects and advantages of my invention will become apparent as the following description proceeds and the features of novelty which characterize my invention will be pointed out with particularity in the claims annexed to and forming a part of this specification.

For a better understanding of my invention reference may be had to the accompanying drawings in which.

Figure 1:
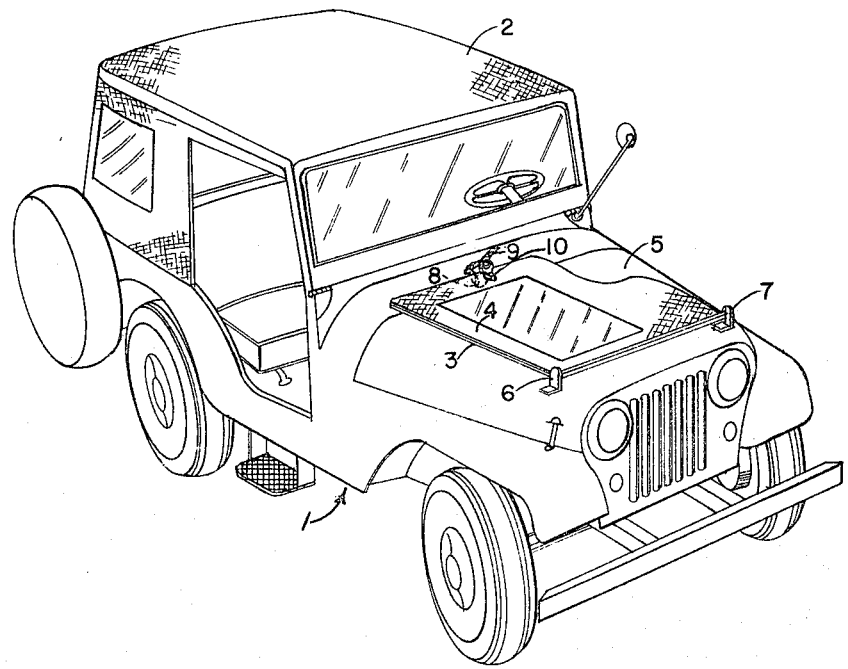
FIG. 1 is a perspective view of a Jeep-type vehicle with a device for mounting the doors on the hood of this vehicle embodying my invention.
Figure 2:
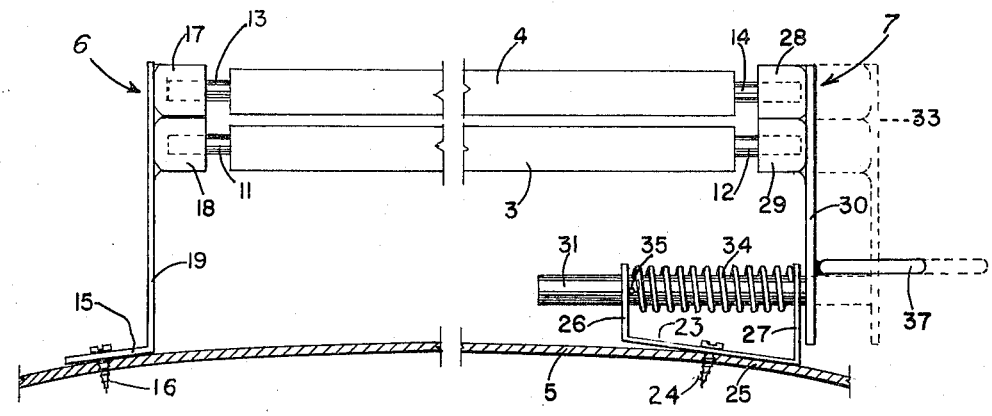
FIG. 2 is a partial side-elevational view of the mounting device shown in FIG. 1.

Referring now to the drawings in FIG. 1, there is shown a Jeep-type vehicle generally indicated by numeral 1. This vehicle has a top and pair of doors which are removable for fair-weather driving. The top 2 is shown in place and doors 3 and 4 are shown removed from the normal door position and mounted on and in spaced relation to the top of the hood 5. A spaced pair of left and right support members 6 and 7 as viewed from the front of the vehicle are provided for supporting the doors in a manner described more fully hereinafter.

A holding member or hook 8, mounted on the cowl under the doors 3 and 4 shown in FIG. 1, is used to fasten an elastic cord 9 on one end to the door handles 10 for further securing the rearward portion of the doors on the vehicle.

Door 3 has a top hinge pin 11 and a bottom hinge pin 12. Door 4 has a top hinge pin 13 and a bottom hinge pin 14. These hinge pins serve to secure each door in position during their normal door functioning.

Support member 6 includes a base portion 15 resting on and rigidly attached to the top of hood 5 by a suitable fastener such as a metal screw 16. Adjoining upper and lower socket portions 17 and 18 are disposed in spaced relation above base portion 15 by an upstanding portion 19 extending from the base portion vertically and across the rearward ends of the socket portions 17 and 18. These socket portions 17 and 18 extend inwardly and substantially horizontally with their open ends facing inwardly. The shaping of the opening in each socket portion is such as to slidably receive the ends of the door hinge pins. The spacing between adjoining socket portions must be sufficient to allow for the thickness of the doors and provide an air gap therebetween.

Support member 7 includes a base portion 23 resting on and rigidly attached to the top of the hood 5 by a metal screw 24. Base portion 23 extends upwardly at both ends to provide a pair of parallel vertically disposed depending members 26 and 27. Adjoining upper and lower socket portions 28 and 29 are disposed above the base portion 23 by an upstanding portion 30, a shaft 31, and depending members 26 and 27 through which shaft 31 slidably extends. Upstanding portion 30 extends across the rearward end of the socket portions and along a portion of the exterior side of outer depending member 27.

Shaft 31 attaches to the inner side of the upstanding portion 30 at right angles therewith and extends parallel with the socket portions. An aperture of slightly greater size and shape than the cross section of shaft 31 is provided in each of the depending members 26 and 27 and these apertures are at the same elevation to dispose shaft 31 which extends therethrough in a substantially horizontal position. The cross section of shaft 31 is preferably square or other similar shaping other than round to prevent rotational movement of shaft 31 during its longitudinal movement. Shaft 31 extends beyond the inner depending member 26 a substantial distance to allow for substantial outward longitudinal movement of the shaft 31 to release the doors in a manner described more fully hereinafter. Upstanding portion 30 rests against or abuts the outer surface of depending member 27 at the position of shortest spacing between support members 6 and 7.

The top hinge pins 11 and 13 are inserted into socket portions 18 and 17, respectively. The bottom hinge pins 12 and 14 are inserted into socket portions rsepectively. Adjoining socket portions 17, 18 and 28, 29 are held in spaced relationship by a biasing arrangement a distance less than the ends or extremities of the upper and lower hinge pin of each door. Doors 3 and 4 are thereby supported in a substantially horizontal positions in spaced relation with each other and with the exterior surface of hood 5.

In this holding position the hinge pins of each door are held or clamped against respective socket portions under compression or biasing forces which limit the hinge pin movement in the socket portions, thereby firmly supporting the doors on the vehicle. Preferably, a slight air gap is provided between the upstanding portion 30 and depending member 27 when the socket portions are held against the ends of the hinge pins.

The biasing arrangement for holding or clamping the hinge pins between the socket portions as described above is preferably provided by a biasing means such as a coil spring 34 which fits over shaft 31 between depending members 26 and 27. A pin 35 extends through shaft 31 and between spring 34 and inner depending member 26 so that spring 34 is held under compression between pin 35 and the inner surface of the depending member 27.

This compressive action on spring 34 pulls the socket portions firmly against the hinge pins.

Various means may be provided for detachment of the doors so supported. I prefer a slidable arrangement wherein one of the socket portions moves away from the other. This slidable arrangement is provided by the apertured depending members 26, 27 and shaft 31 previously described.

Movement of shaft 31 outwardly to a second position indicated by broken line 33 wherein the socket portions are spaced a distance greater than the ends of the upper and lower hinge pins releases the doors. At position 33 spring 34 is further compressed so that upon release of shaft 31 with the hinge pins removed socket portions will return to a stable position with upstanding portion 30 held against depending member 27. The compression spring 34 thus serves the dual function of firmly attaching the socket portions 28 and 29 on the base 24 when the doors are not carried on the hood, and in addition holding the socket portions against the hinge pins when the doors are carried on the hood.

A gripping member or handle 37 is attached to the outer surface of upstanding portion 30 for pulling or extending the socket portions to the position indicated at 33. Handle 37 is preferably a loop which will receive a finger of the operator in grasping relationship.

The mounting of the detached doors on the hood by the support members 6 and 7 above described may be accomplished in the following manner. Doors 3 and 4 are first placed on the hood with hinge pins 13, 11, 14 and 12 adjoining socket portions 17, 18, 28 and 29. Handle 37 is pulled outwardly extending socket portions 28 and 29 to the position indicated at 33. The ends of the hinge pins are aligned with the socket portions and handle 37 is released. Cord 9 is attached to door handle 10 and hooked or looped over hook 8.

With the above described mounting arrangement doors 3 and 4 may be mounted in either the upper or lower position with respect to the exterior surface of the hood. As for example, door 4 may be mounted in the lower socket portions by inverting door 4 from that shown in FIG. 1 and inserting its upper hinge pin 13 in socket portion 29 and the lower hinge pin 14 inserted in socket portion 18. In either position the vinyl surfaces of the doors are preferably up or down.

The doors are sufficiently supported to allow for normal use of the vehicle without impairing the driver's vision or otherwise interfering with its normal use. The doors are easily detached by reversing the steps above outlined.

Although I have illustrated a specific embodiment of my invention, various modifications will occur to those skilled in the art. Therefore I do not desire my invention to be limited to the specific details illustrated and described and I intend by the appended claims to cover all modifications which will fall within the spirit and scope of my invention.

I claim:

1. A device for mounting doors on the hood of a Jeep-type vehicle having a demountable top and door assembly, said device comprising a pair of support means each having spaced base portions for rigid attachment to a top surface of the hood of said vehicle and alined socket portions disposed above the respective base portions adapted for receiving at least one upper and lower hinge pin attached to the door, said socket portions when in a holding position spaced a distance less than the ends of the upper and lower hinge pins when the ends are positioned in said socket portions, and means for releasing the hinge pins so supported for detachment of the door.

2. A device for mounting doors on the hood of a Jeep-type vehicle having a demountable top and door assembly, said device comprising a pair of support means each having spaced base portions for rigid attachment to a top surface of the hood of said vehicle and alined socket portions disposed above the respective base portions adapted for receiving at least one upper and lower hinge pin attached to a door, said socket portions when in a clamping position spaced a distance less than the extremities of the upper and lower hinge pins when the extremities are positioned in said socket portions, and means for releasing the hinge pins so clamped for detachment of the door.

3. A device for mounting doors on the hood of a Jeep-type vehicle having a demountable top and door assembly, said device comprising a pair of support means each having spaced base portions for rigid attachment to a top surface of the hood of said vehicle and alined socket portions disposed above the respective base portions and shaped to slidably receive at least one upper and lower hinge pin attached to a door, said socket portions when in a holding position spaced a distance less than the ends of the upper and lower hinge pins when the ends are positioned in said socket portions, and means for releasing the hinge pins so supported for detachment of the door.

4. A device for mounting doors on the hood of a Jeep-type vehicle having a demountable top and door assembly, said device comprising a pair of support means each having spaced base portions for rigid attachment to a top surface of the hood of said vehicle and alined socket portions disposed above the respective base portions and shaped to slidably receive at least one upper and lower hinge pin attached to a door, said socket portions when in a holding position spaced a distance less than the ends of the upper and lower hinge pins when the ends are positioned in said socket portions, one said socket portion movable away from the other socket portion to a second postion for releasing the hinge pins so supported for detachment of the door.

5. A device for mounting doors on the hood of a Jeep-type vehicle having a demountable fabric top and door assembly, said device comprising a pair of support means each having spaced base portions for rigid attachment of a top surface of the hood of said vehicle and alined socket portions disposed above the respective base portions and shaped to slidably receive at least one upper and lower hinge pin attached to a door, said socket portions when in a holding position spaced a distance less than the ends of the upper and lower hinge pins when the ends are positioned in said socket portions, one said socket portion movable away from the other socket portion to a second position for releasing the hinge pins so supported for detachment of the door and grip means for movement of said one socket portion.

6. A device for mounting doors on the hood of a Jeep-type vehicle having a demountable fabric top and door assembly, said device comprising a pair of support means each having spaced base portions for rigid attachment to a top surface of the hood of said vehicle and alined socket portions disposed above the respective base portions and shaped to slidably receive at least one upper and lower hinge pin attached to a door, said socket portions spaced a distance less than the ends of the upper and lower hinge pins when the ends are positioned in said socket portions, means for clamping said hinge pins between said socket portions, one said socket portion movable away from the other socket portion to a second position for releasing the hinge pins so clamped for detachment of the door.

7. A device for mounting doors on the hood of a Jeep-type vehicle having a demountable top and door assembly, said device comprising a pair of support means each having spaced base portions for rigid attachment to a top surface at a forward position on the hood of said vehicle and a pair of adjoining socket portions disposed above the respective base portions, each said socket portion adapted to receive an upper and lower hinge pin attached to each of a pair of doors, one pair of adjoining socket portions when in a holding position spaced a distance less than the ends of the upper and lower hinge pin of each door to support said doors in spaced relation above the hood when the hinge pin ends are positioned in respective socket portions, and means for releasing the hinge pin so supported for detachment of the doors.

8. The combination of a Jeep-type vehicle having a demountable top and door assembly with a substantially flat hood and a device for mounting doors on said hood, said device comprising a pair of support means each having spaced base portions for rigid attachment to a top surface of said hood and alined socket portions disposed above the respective base portions and adapted to receive an upper and lower hinge pin attached to a door, said socket portions in a holding position spaced at a distance less than the ends of the upper and lower hinge pins when the ends are positioned in said socket portions, and means for releasing the hinge pins so supported for detachment of the door.

9. The combination of a Jeep-type vehicle having a demountable fabric top and door assembly with a substantially flat hood and a device for mounting doors on said hood, said device comprising a pair of support means each having spaced base portions for rigid attachment to a top surface of said hood and alined socket portions disposed above the respective base portions and adapted to receive upper and lower hinge pins attached to the forward portion of a door, said socket portions in a holding position spaced at a distance less than the ends of said upper and lower hinge pins when the ends are positioned in said socket portions, one said socket portion movable away from said other socket portion to a second position for releasing the hinge pins so supported for detachment of the door.

10. A device for mounting doors on the hood of a Jeep-type vehicle having a demountable top and door assembly, said device comprising a pair of support means each having spaced base portions for rigid attachment to a top surface of the hood of said vehicle and alined socket portions disposed above the respective base portions and shaped to slidably receive at least one upper and lower hinge pin attached to a door, said socket portions when in a holding position spaced a distance less than the ends of the upper and lower hinge pins when the ends are positioned in said socket portions, and means for releasing the hinge pins so supported for detachment of the door and means attached to an exterior surface of the vehicle for detachably fastening the rearward portion of the door to said exterior surface.

11. A device for mounting doors on the hood of a Jeep-type vehicle having a demountable top and door assembly, said device comprising a pair of support means each having spaced base portions for rigid attachment to a top surface at a forward position on the hood of said vehicle and a pair of adjoining socket portions disposed above the respective base portion, each said socket portion adapted to receive an upper and lower hinge pin attached to each of a pair of doors, one pair of adjoining socket portions when in a holding position spaced a distance less than the ends of the upper and lower hinge pin of each door to support said doors in spaced relation above the hood when the hinge pin ends are positioned in respective socket portions, and means for releasing the hinge pins so supported for detachment of the door, a hook member attached to an exterior surface of the vehicle, and means attaching to the hook member and a door handle for detachably fastening the door to said exterior surface.

References Cited by the Examiner
UNITED STATES PATENTS 1,991,900   2/1935   Larsen _____ 224—42.1 X GERALD M. FORLENZA, *Primary Examiner.*

F. WERNER, *Assistant Examiner.*